United States Patent
Mirkin et al.

(10) Patent No.: US 10,025,779 B2
(45) Date of Patent: Jul. 17, 2018

(54) SYSTEM AND METHOD FOR PREDICTING AN OPTIMAL MACHINE TRANSLATION SYSTEM FOR A USER BASED ON AN UPDATED USER PROFILE

(71) Applicant: Xerox Corporation, Norwalk, CT (US)

(72) Inventors: Shachar Mirkin, Meylan (FR); Jean-Luc Meunier, Meylan (FR)

(73) Assignee: XEROX Corporation, Norwalk, CT (US)

(*) Notice: Subject to any disclaimer, the term of this patent is extended or adjusted under 35 U.S.C. 154(b) by 291 days.

(21) Appl. No.: 14/825,652

(22) Filed: Aug. 13, 2015

(65) Prior Publication Data

US 2017/0046333 A1  Feb. 16, 2017

(51) Int. Cl.
*G06F 17/28* (2006.01)

(52) U.S. Cl.
CPC ........ *G06F 17/2818* (2013.01); *G06F 17/289* (2013.01)

(58) Field of Classification Search
CPC .......................... G06F 17/2818; G06F 17/289
See application file for complete search history.

(56) References Cited

U.S. PATENT DOCUMENTS

| | | | |
|---|---|---|---|
| 6,182,026 B1 | 1/2001 | Tillmann et al. | |
| 7,756,753 B1 | 7/2010 | McFarland | |
| 8,756,050 B1* | 6/2014 | Harkness | G06F 17/289 704/1 |
| 8,805,672 B2* | 8/2014 | Caskey | G06F 17/289 704/2 |
| 8,983,825 B2* | 3/2015 | Sarr | G06F 17/289 704/10 |
| 9,053,096 B2* | 6/2015 | Lord | G06F 17/289 |
| 2002/0116291 A1* | 8/2002 | Grasso | G06F 17/30011 707/736 |
| 2004/0024581 A1 | 2/2004 | Koehn et al. | |
| 2004/0030551 A1 | 2/2004 | Marcu et al. | |
| 2006/0190241 A1 | 8/2006 | Goutte et al. | |
| 2007/0150257 A1 | 6/2007 | Cancedda et al. | |
| 2007/0265825 A1 | 11/2007 | Cancedda et al. | |
| 2008/0077575 A1* | 3/2008 | Tateno | G06F 17/30386 |
| 2008/0300857 A1 | 12/2008 | Barbaiani et al. | |
| 2010/0125570 A1* | 5/2010 | Chapelle | G06F 17/30864 707/722 |
| 2010/0268661 A1* | 10/2010 | Levy | G06Q 30/02 705/347 |

(Continued)

OTHER PUBLICATIONS

U.S. Appl. No. 14/669,153, filed Mar. 26, 2015, Renders.

(Continued)

*Primary Examiner* — Walter Yehl
(74) *Attorney, Agent, or Firm* — Fay Sharpe LLP

(57) ABSTRACT

A system and method predict an optimal machine translation system for a first of a set of users. The method includes, for each of the users, providing a respective user profile which includes rankings for at least some machine translation systems from a set of machine translation systems. The user profile of the first user is updated, based on the user profiles of at least a subset of the other users. The updating includes generating at least one missing ranking. An optimal translation system for the first user from the set of machine translation systems is predicted, based on the updated user profile computed for the first user.

20 Claims, 8 Drawing Sheets

(56) References Cited

U.S. PATENT DOCUMENTS

| | | | |
|---|---|---|---|
| 2011/0022380 A1 | 1/2011 | Zaslayskiy et al. | |
| 2011/0178791 A1 | 7/2011 | Stymne et al. | |
| 2011/0282643 A1 | 11/2011 | Chatterjee et al. | |
| 2011/0288852 A1 | 11/2011 | Dymetman et al. | |
| 2011/0307245 A1 | 12/2011 | Hannerman et al. | |
| 2012/0041753 A1 | 2/2012 | Dymetman | |
| 2012/0101804 A1 | 4/2012 | Roth et al. | |
| 2012/0259807 A1 | 10/2012 | Dymetman | |
| 2013/0054593 A1* | 2/2013 | Park | G06F 17/30699 707/736 |
| 2013/0226839 A1* | 8/2013 | Archambeau | G06N 3/08 706/12 |
| 2014/0067361 A1 | 3/2014 | Nikoulina et al. | |
| 2014/0156579 A1* | 6/2014 | Bouchard | G06F 17/16 706/46 |
| 2014/0180760 A1* | 6/2014 | Karatzoglou | G06Q 30/0269 705/7.29 |
| 2014/0200878 A1 | 7/2014 | Mylonakis et al. | |
| 2014/0207439 A1* | 7/2014 | Venkatapathy | G06F 17/2836 704/4 |
| 2014/0258027 A1 | 9/2014 | Joannes et al. | |
| 2014/0365201 A1 | 12/2014 | Gao et al. | |
| 2015/0019200 A1* | 1/2015 | Woodward | G06F 17/2836 704/2 |
| 2015/0199339 A1 | 7/2015 | Mirkin et al. | |
| 2016/0188576 A1* | 6/2016 | Huang | G06F 17/2854 704/2 |

OTHER PUBLICATIONS

Axelrod, A., et al., "Domain adaptation via pseudo in-domain data selection," Proc. Conf. on Empirical Methods in Natural Language Processing, EMNLP '11, pp. 355-362 (2011).

Bisazza, A., et al., "Fill-up versus interpolation methods for phrase-based SMT adaptation," Proc. Int'l Workshop on Spoken Language Translation (IWSLT), pp. 136-143 (2011).

Bojar, O., et al., "Findings of the 2013 Workshop on Statistical Machine Translation," Proc. 8th Workshop on Statistical Machine Translation, pp. 1-44 (2013).

Carletta, J., "Assessing agreement on classification tasks: The kappa statistic," Computational Linguistics, 22(2):249-254(1996).

Cohen, J., "A Coefficient of Agreement for Nominal Scales," Educational and Psychological Measurement, 20(1) pp. 37-46 (1960).

Doddington, G., "Automatic evaluation of machine translation quality using n-gram co-occurrence statistics," Proc. 2nd Int'l Conf. on Human Language Technology Research, pp. 138-145 (2002).

Federico, M., et al., "The Matecat tool," Proc. COLING 2014, 25th Int'l Conf. on Computational Linguistics: System Demonstrations, pp. 129-132 (2014).

Foster, G., et al., "Mixture-model adaptation for SMT," Proc. $2^{nd}$ Workshop on Statistical Machine Translation (WMT), pp. 128-135 (2007).

Gascó, G., et al., "Does more data always yield better translations?" Proc. 13th Conf. of the European Chapter of the Association for Computational Linguistics, pp. 152-161 (2012).

Kirchhoff, K., et al., "Evaluating user preferences in machine translation using conjoint analysis," Proc. European Association of Machine Translation, 16:119-126 (2012).

Koehn, P., "Simulating human judgment in machine translation evaluation campaigns," IWSLT, pp. 179-184 (2012).

Kölmel, B., et al., "Location based advertising," Proc. 1st Int'l Conf. on Mobile Business, pp. 1-7 (2002).

Macháček, M. et al., "Evaluating machine translation quality using short segments annotations," The Prague Bulletin of Mathematical Linguistics, No. 103, pp. 85-110 (2015).

Mirkin, S., et al., "Data selection for compact adapted SMT models," Proc. 11th biennial conf. of the Association for Machine Translation in the Americas (AMTA—2014), pp. 301-314 (2014).

Nepveu, L., et al., "Adaptive language and translation models for interactive machine translation," Proc. EMNLP pp. 190-197 (2004).

Neumeyer, L., et al., "A comparative study of speaker adaptation techniques," 4th European Conf. on Speech Communication and Technology, EUROSPEECH 1995, pp. 18-21 (1995).

Papineni, K., et al., "BLEU: a Method for Automatic Evaluation of Machine Translation," Proc. ACL, pp. 311-318 (2002).

Pearson, K., "Note on regression and inheritance in the case of two parents," Proc. Royal Soc. London, 58, pp. 240-242 (1895).

Rendle, et al., "Online-updating regularized kernel matrix factorization models for large-scale recommender systems," Proc. 2008 ACM Conf. on Recommender Systems (RecSys), pp. 1-21 (2008).

Resnick, P, et al., "Grouplens: an open architecture for collaborative filtering of Netnews," Proc. 1994 ACM Conf. on Computer Supported Cooperative Work, pp. 175-186 (1994).

Ricci, F., Rokach, L., and Shapira, B., "Introduction to recommender systems handbook," pp. 1-35 (2011).

Sarwar, B., et al., "Item-based collaborative filtering recommendation algorithms," Proc.10th Int'l Conf. on World Wide Web, pp. 285-295 (2001).

Snover, M., et al., "A Study of Translation Edit Rate with Targeted Human Annotation," Proc. of Association for Machine Translation in the Americas, pp. 223-231(2006).

Specia, L., et al., "Estimating the sentence-level quality of machine translation systems," 13th Conf. of the European Association for Machine Translation, pp. 28-37 (2009).

Speretta, M., et al., "Personalized search based on user search histories," Proc. 2005 IEEE/WIC/ACM Int'l Conf. on Web Intelligence, pp. 622-628 (2005).

Turchi, et al., Coping with the subjectivity of human judgements in MT quality estimation, Proc. 8th Workshop on Statistical Machine Translation, pp. 240-251 (2013).

Wilcoxon, F., "Individual Comparisons by Ranking Methods," Biometrics Bulletin, 1(6), pp. 80-83 (1945).

* cited by examiner

| MT PAIR | PAIRWISE MT SYSTEM RANKINGS | | | | | | METADATA | | | |
|---|---|---|---|---|---|---|---|---|---|---|
| | 1,2 | 1,3 | 1,4 | 2,3 | 2,4 | 3,4 | A | B | C | D |
| USER A | 0.1 | NA | 0.7 | -0.3 | 0.4 | NA | 1 | 3 | 4 | 4 |
| USER B | NA | -0.4 | NA | -0.2 | 0.7 | 0.2 | 1 | 2 | 1 | 1 |
| USER C | 0.4 | 0.1 | 0.6 | NA | 0.4 | NA | 0 | 5 | 3 | 3 |
| USER D | NA | NA | 0.4 | -0.1 | 0.5 | 0.1 | NA | NA | NA | NA |
| USER E | 0.2 | -0.1 | NA | NA | 0.7 | 0.8 | 0 | 4 | 1 | 2 |
| USER F | 0.5 | 0.2 | 0.9 | 0.1 | NA | NA | 0 | 2 | 2 | 5 |
| USER G | 0.1 | -0.4 | 0.7 | -0.4 | NA (0.5) | NA | 1 | 5 | 2 | 1 |
| USER H | NA | NA | NA | -0.1 | NA | NA | 0 | 5 | 2 | 3 |

FIG. 6

SYSTEM AND METHOD FOR PREDICTING AN OPTIMAL MACHINE TRANSLATION SYSTEM FOR A USER BASED ON AN UPDATED USER PROFILE

BACKGROUND

The exemplary embodiment relates to machine translation and finds particular application in connection with a system and method for predicting an optimal translation system for a given user, or for use in performing machine translation of text for that user.

With the availability of large amounts of data, customer applications are tending to become more personalized, accommodating the customer's behavior in order to create a unique experience and provide a better service to each user. Such personalization is done through customer modeling, based on the customers' attributes, such as demographics (gender, age, etc.), preferences, and personalities. For example, in the field of information retrieval, search results are often customized based on location or the user's search history. Automatic speech recognition and targeted advertising are other areas where personalization has been successfully employed.

When customers speak different languages, modeling customers and interacting with them involve multilingual aspects. Multilingual customers may express themselves differently, discuss different topics, and even have a somewhat different personality in each language. Machine translation (MT) systems, however, have not been personalized for customers, in part, because training statistical machine translation (SMT) models relies on the availability of a large amount of parallel training data for the language-pair, i.e., a corpus where each sentence in one language (the source language) is translated to the other language (the target language). Using training data of the same domain of the text being translated has a significant positive impact on the quality of the translation. Domain adaptation allows SMT models to be adapted to a particular topic, genre, or style.

Domain adaptation can be performed, for example, using an organization's corpora. Other methods include data-selection (Axelrod, A., et al., "Domain adaptation via pseudo in-domain data selection," EMNLP '11, pp. 355-362 (2011), Gascó, G., et al., "Does more data always yield better translations?" Proc. 13th Conf. of ECACL, pp. 152-161 (2012), Mirkin, S., et al., "Data selection for compact adapted SMT models," AMTA-2014, pp. 301-314 (2014)), mixture models (Foster, G., et al., "Mixture-model adaptation for SMT," Proc. WMT, pp. 128-135 (2007)) and table fill-up (Bisazza, A., et al., "Fill-up versus interpolation methods for phrase-based SMT adaptation," Proc. IWSLT, pp. 136-143 (2011)).

However, even though domain adaptation can be achieved with a smaller amount of training data than is used for building a machine translation model from scratch, by adaptation of translation systems to the topic, genre or the style of the translated material, such methods do not factor in the user's own particular preferences of one translation over another.

In some cases, it is feasible to deploy several distinct translation systems (or different models of the same system) and then choose among the multiple alternative translations that are produced for a given input text. The choice may be made by a professional translator or by using automatic estimation of the quality of the translations. These approaches assume that the choice of the best system is independent of the actual user receiving the translation. However, this does not account for the customer's personal translation preferences (TPs) for choosing which translation system to use. TP is a factor when alternative translations are all correct or when each of them is wrong in a different way. In the former case, a preference may be a stylistic choice, and in the latter, a matter of comprehension or a selection of the least intolerable error, in the user's opinion. For example, one user may place a priority on having the syntax correct, even if some words remain untranslated, while another may prefer that all the words are translated, even at the cost of some syntactic flaws. One user may prefer shorter sentences than others, or may favor a more formal style, while another would prefer a more casual style. One user may accept reordering errors but be more demanding concerning punctuations. Such differences may be the result of the type of translation system being employed (e.g. syntax- vs. phrased-based), the specific training data or many other factors. On the user's side, a preference may be attributed, for example, to native language, age, personality, or other factors.

Users can also utilize their own glossaries (Federico, M., et al., "The Matecat tool," Proc. COLING 2014: System Demonstrations, pp. 129-132 (2014)), corpora (parallel or monolingual) and translation memories (TM), either shared or private ones (U.S. Pat. No. 8,805,672 to Caskey, et al.). Through Adaptive and Interactive MT, the system learns from the translator's edits, to avoid repeating errors that have already been corrected (Nepveu, L., et al., "Adaptive language and translation models for interactive machine translation," Proc. EMNLP, pp. 190-197 (2004)). Post-editions can continuously be added to the translator's TM or be used as additional training material, for tighter adaptation to the domain of interest, through batch or incremental training. While useful, such methods take time to implement and may discourage users from trying new translation models. Additionally, most of the focus is on customization for companies or professional translators.

Given a set of two or more translation models to choose from, metrics for inter-rater reliability or inter-annotator agreement, such as Cohen's Kappa Cohen, J., "A Coefficient of Agreement for Nominal Scales," Educational and Psychological Measurement, 20(1) pp. 37-46 (1960) can measure the extent to which annotators disagree on which is the better of two or more translations. Disagreement may be the result of an untrained annotator, a task that is not well defined, or when there is no obvious truth. In the case of the evaluation of translation quality, it is not always straightforward to tell whether one translation is better than another. A single sentence can be translated in multiple correct ways or in multiple incorrect ways. The choice of what is best often depends on the users' preferences. Kappa levels, even when measured on simpler tasks, such as short segments, are often low. (Macháček, M. et al., "Evaluating machine translation quality using short segments annotations," The Prague Bulletin of Mathematical Linguistics, No. 103, pp. 85-110 (2015)).

There remains a need for a system and method for personalized machine translation (PMT).

INCORPORATION BY REFERENCE

The following references, the disclosures of which are incorporated herein in their entireties by reference, are mentioned:

Recommender systems and collaborative filtering methods are described, for example, in U.S. Pat. No. 7,756,753 and U.S. Pub. Nos. 20130226839, 20140156579, 20140180760, 20140258027, and U.S. application Ser. No.

14/669,153, filed Mar. 26, 2015, entitled TIME-SENSITIVE COLLABORATIVE FILTERING THROUGH ADAPTIVE MATRIX COMPLETION, by Jean-Michel Renders.

U.S. Pat. No. 8,805,672, issued Aug. 12, 2014, entitled TRANSLATION CACHE PREDICTION, by Caskey, et al., describes a method for client side translation cache prediction which includes obtaining meta data associated with a request, applying a cache prediction model to the meta data to automatically predict one or more translations associated with the request, and storing them in a client translation cache.

Machine translation systems are described, for example, in U.S. Pat. No. 6,182,026 and U.S. Pub. Nos. 2004/0024581; 2004/0030551; 2006/0190241; 2007/0150257; 2007/0265825; 2008/0300857; 2011/0022380; 2011/0178791; 2011/0282643; 2011/0288852; 2011/0307245; 2012/0041753; 2012/0101804; 2012/0259807; 2014/0067361; 2014/0200878; 2014/0365201; and 2015/0199339.

BRIEF DESCRIPTION

In accordance with one aspect of the exemplary embodiment, a method for predicting an optimal machine translation system for a user is provided. The method includes, for each of a set of users, providing a respective user profile which includes rankings for at least some machine translation systems from a set of machine translation systems, the set of users including a first user and a plurality of other users. The user profile of the first user is updated, based on the user profiles of at least a subset of the other users. The updating includes generating at least one missing ranking. An optimal translation system is predicted for the first user from the set of machine translation systems, based on the updated user profile computed for the first user.

At least one of the updating and the predicting of the optimal translation system may be performed with a processor.

In accordance with another aspect of the exemplary embodiment, a system for predicting an optimal machine translation system for a user includes memory which stores a user profile for each of a set of users, each user profile including pairwise rankings for at least some pairs of machine translation systems drawn from a set of associated machine translation systems. A similarity computation component computes a similarity between a user profile of a first of the set of users and a user profile of another other of the set of users, for each of a subset of the users whose user profiles include a pairwise ranking for a selected pair of the machine translation systems. A nearest neighbor identification component identifies, based on the computed similarities, a set of the other users as nearest neighbors to the first user. A prediction component predicts an optimal machine translation system for the first user from the set of machine translation systems, based on a pairwise ranking computed for the selected pair of machine translation systems, the pairwise ranking for the pair of the machine translation systems being computed as a function of the pairwise rankings of the nearest neighbors for the selected pair of machine translation systems. A processor implements the similarity computation component, nearest neighbor identification component, and prediction component.

In accordance with another aspect of the exemplary embodiment, a translation method includes providing a set of machine translation systems for a selected language pair. For each of a set of users, a respective user profile is provided, which includes pairwise rankings for at least some pairs of the machine translation systems in the set of machine translation systems. The set of users includes a first user and a plurality of other users. For each of at least one pair of the machine translation systems, a set of nearest neighbors to the first user is identified, based on a computed similarity between the first user's user profile and a respective other user's user profile. An optimal translation system is predicted for the first user from the set of machine translation systems, based on the profiles of the nearest neighbors. Source language text is translated into target language text using the optimal translation system.

At least one of the identifying of the set of nearest neighbors, the predicting of the optimal translation system, and the translating of the source language text may be performed with a processor.

BRIEF DESCRIPTION OF THE DRAWINGS

FIG. 6 shows an example user preferences matrix incorporating metadata;

DETAILED DESCRIPTION

Aspects of the exemplary embodiment relate to a system and method for personalizing selection of a Machine Translation (MT) system for use in translating text from a first (source) natural language to a second (target) natural language different from the first natural language.

One exemplary method, denoted Collaborative Translational Preferences (CTP), is based on a k-nearest-neighbors approach for user-user collaborative filtering. The translational preferences of a user are predicted based on those of similar users. A user preference (or "ranking") is considered as a choice between two translation systems indicating which system's translations the user generally prefers. Given two translation systems (or models of the same system) the method is able to predict which one the user would prefer, without assuming the user has ever expressed a preference between these two specific systems. The exemplary method considers the users' overall preferences of systems, without regard to the specific sentence that is being translated. However, in other embodiments, the system may be adapted to take into account other factors, such as domain-specific factors, or features of the sentence being translated (e.g., does sentence contain named entities, is it long or short), or the like, provided sufficient training data is available for evaluating the influence of sentence features on user translation preferences.

The exemplary method and system thus predict the user's ranking for a given translation system pair based on the rankings of similar users, whose rankings for a set of translation system pairs are similar to those of the user. The system proposes a translation system to the user which is expected to provide a translation of the source text which the user would prefer, on average.

The user may be a receiver (e.g., reader) of the text to be translated or an author of the text to be translated and may be a single person or, in some instances, a group of people. Given two MT systems, the system and method aim to predict which of the translation systems the user would choose, assuming no knowledge about the user's preference between them.

Figure 1:
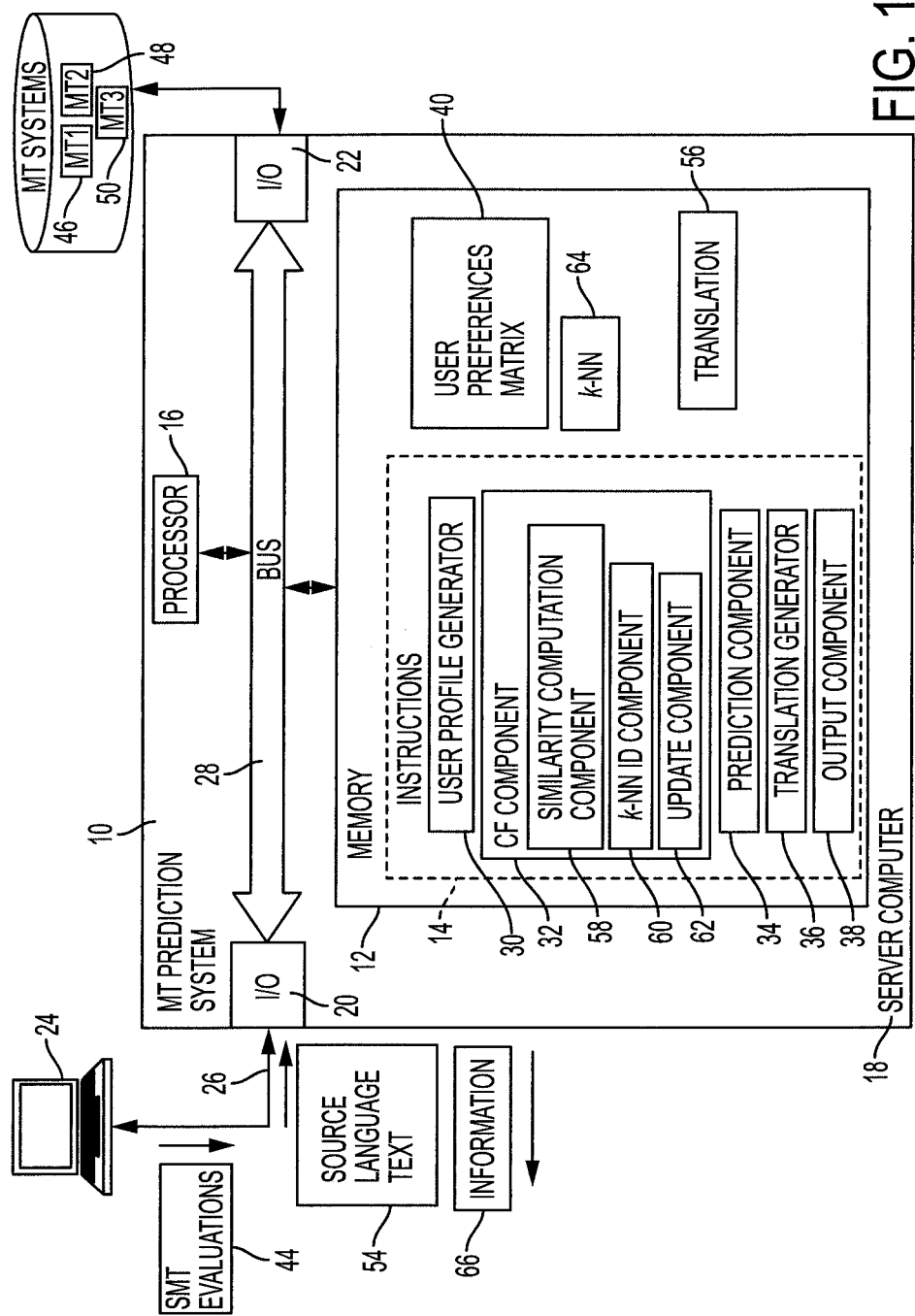
FIG. 1 is a functional block diagram of a system for predicting an optimal machine translation system in accordance with one aspect of the exemplary embodiment.

With reference to FIG. 1, a computer-implemented system 10 for identifying a machine translation system or component thereof to be used for performing a translation for a given user, based on user rankings, is shown. The system 10 includes memory 12 which stores instructions 14 for performing the method illustrated in FIG. 2 and a processor 16 in communication with the memory for implementing the instructions. The system 10 may be hosted by one or more computing devices such as the illustrated server computer 18. One or more input/output devices 20, 22 allow the system to communicate with external devices, such as the illustrated client device 24, via a wired or wireless link 26, such as the Internet. Hardware components 12, 16, 20, 22 of the system communicate via a data/control bus 28.

The instructions 14 include a user profile generator 30, a collaborative filtering (CF) component 30, a prediction component 32, optionally a translation generator 34, and an output component 36.

Briefly, the user profile generator 28 generates user profiles 40 for each of a set of users, e.g., in the form of a user preferences matrix or other data structure. There may be at least five or at least ten, or at least twenty, or at least fifty, or more users in the set of users. The profiles are based on user evaluations 44 of translations performed by different machine translation systems 46, 48, 50, etc. configured for performing translations for a given source language and target language pair.

The machine translation systems 46, 48, 50 can each be an entire machine translation system which takes as input source text 54 in a same source natural language (e.g., French) as the other systems and outputs a translation 56 in a same target natural language (e.g., English) as the other systems. Or, the machine translation systems 46, 48, 50 may be only a component of a machine translation system, such as different machine translation models (e.g., phrase tables) or different named entity recognition components, or combinations thereof, to be used in a machine translation system, together with other components of the machine translation system, which may be preselected. The machine translation systems can be of different types of statistical machine translation systems, such as phrase-based and syntax-based machine translation systems, or of the same type. The MT systems may each include a model which has been trained using the same parallel corpus of training sentences or trained using different corpora. The MT systems may include the same or different decoders. While three machine translation systems are illustrated, there may be at least three, or at least four or at least five, or at least ten or more of the machine translation systems 46, 48, 50 for a given language pair. Despite any similarities between these MT systems, a given pair of the MT systems for the language pair produces, on average, different translations of at least some source strings, although not necessarily for the source strings being translated at a given time.

The collaborative filtering component 32 updates the profile of a first (target) user from the set of users, by generating one or more missing values, based on the profiles of other users. In one embodiment, the collaborative filtering component 32 includes a similarity computation component 58, a nearest neighbor identification component 60, and an update component 62. The similarity computation component 58 computes a similarity between the first of the users and at least a subset of the other users in the set, based on their respective user profiles 40. The k-NN ID component 60 identifies a set 64 of (up to) k nearest neighbors to the first user, based on their respective similarities. The update component 62 updates the first user profile, based on the user profiles of the identified nearest neighbors. In another embodiment, the CF component 32 uses collective matrix factorization (CMF), or other collaborative filtering method, to generate one or more missing values for the first user's profile, based on the user profiles of the other users.

The prediction component 34 predicts an optimal one of the machine translation systems 46, 48, 50 for use in translating source text 54 into target text in a target language, for the first user, based on the updated first user profile. The source text 54 may include one or more text strings, such as sentences, in the source language.

The optional translation generator 36 outputs a machine translation of the source text 54 in the target language, based on the prediction.

The output component 38 outputs information 66 based on the prediction made by the prediction component, such as the machine translation 56 of the source text or an identifier of the predicted optimal machine translation component. In another embodiment, the information output may include information extracted about the user from the translation.

The computer system 10 may include one or more computing devices 18, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 12 may represent any type of non-transitory computer readable medium such as random access memory (RAM), read only memory (ROM), magnetic disk or tape, optical disk, flash memory, or holographic memory. In one embodiment, the memory 12 comprises a combination of random access memory and read only memory. In some embodiments, the processor 16 and memory 12 may be combined in a single chip. Memory 12 stores instructions for performing the exemplary method as well as the processed data 40, 56, 64.

The network interface 20, 22 allows the computer to communicate with other devices via a computer network, such as a local area network (LAN) or wide area network (WAN), or the internet, and may comprise a modulator/demodulator (MODEM) a router, a cable, and/or Ethernet port.

The digital processor device 16 can be variously embodied, such as by a single-core processor, a dual-core processor (or more generally by a multiple-core processor), a digital processor and cooperating math coprocessor, a digital controller, or the like. The digital processor 16, in addition to executing instructions 14 may also control the operation of the computer 18.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
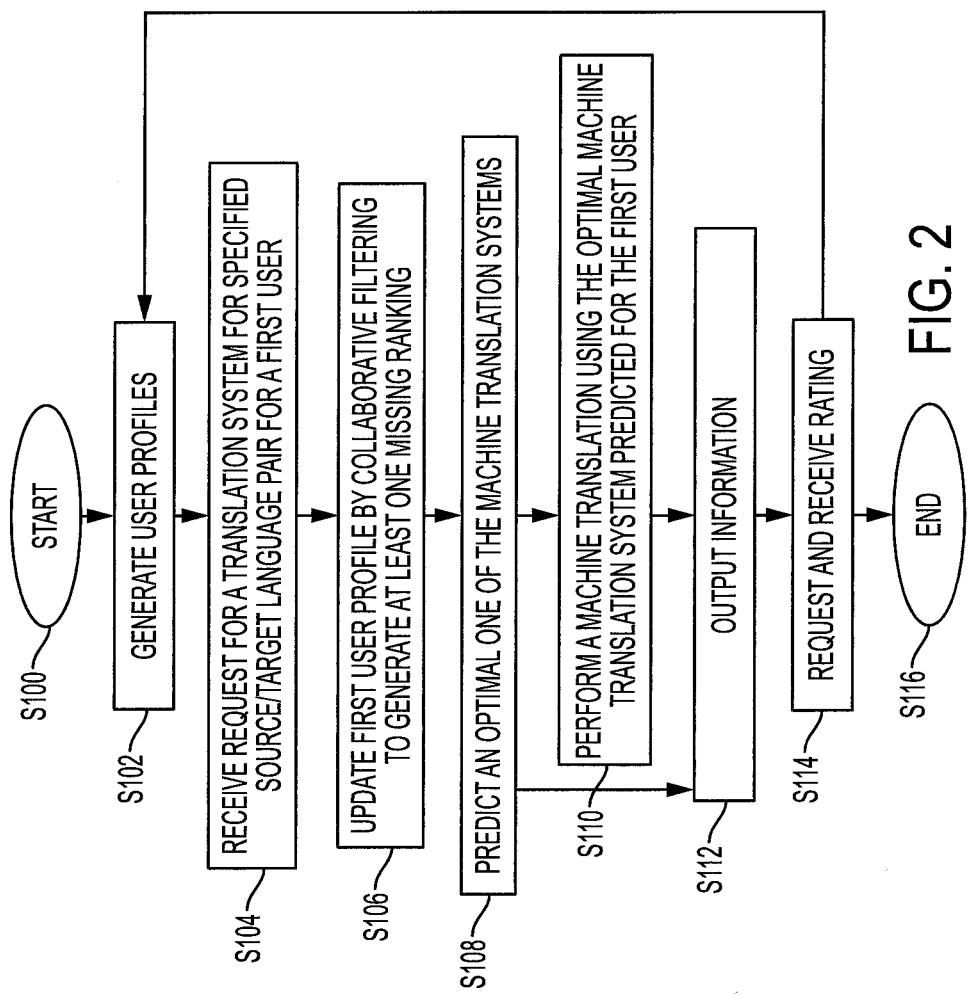
FIG. 2 is a flow chart illustrating a method for predicting an optimal machine translation system in accordance with another aspect of the exemplary embodiment.

FIG. 2 illustrates a machine translation system prediction method which can be performed with the system of FIG. 1. The method begins at S100.

At S102, user profiles 40 are provided, one profile for each of a set of individual users. In one embodiment, the profiles 40 include pairwise rankings of pairs of the machine translation systems generated, e.g., with the user profile generator 30. In this embodiment, user evaluations of machine translations performed by the different machine translation systems are acquired and used, by the user profile generator, to identify user preferences (rankings) regarding translation systems for one or more language pairs, each language pair defining a source language and a target language, different from the source language. In general, each (or at least some) of the users does not evaluate all translation system pairs, but only a subset (less than all) of them. Thus, for at least some of the users, including a first user, some, but not all the MT system pairs are given a ranking. In another embodiment, the user profiles each include, for each of at least a subset of the machine translation systems, a user ranking for that machine translation system, e.g., on a scale of 1-5, with 5 corresponding to very good, and 1 corresponding to very bad. The ranking may be or be based on the user's subjective evaluation of the translation quality of a translation produced by that MT system for one or more source sentences.

At S104, for the first user, a request is received for a prediction of an optimal translation system for performing a machine translation for a selected language pair, or for a translation from a specified source language to a specified target language. The request may be received from the user or from another computing system which is communicatively linked to the system 10.

At S106, the user profile of a first (target) one of the users is updated by the CF component 32, based on the user profiles 40 of at least a subset of the other users, using collaborative filtering.

At S108, an optimal one of the machine translation systems 46, 48, 50 for use in performing a translation for the first user, for the selected language pair, is predicted, e.g., by the prediction component 34.

Optionally, at S110, the predicted optimal machine translation system (entire system or component thereof) is used, by the translation generator 36, to perform a machine translation for the first user by translating source language text 54 to target language text 56 in the target language. The machine translation 56 of the source text into the target language may be output at S112, and/or other information 66 is output, such as the identifier of the predicted optimal machine translation system, or information extracted about the user based on the translation or based on the predicted translation system.

Optionally, at S114, the user may be asked to rate some or all of the output translation against a translation produced by another of the machine translation systems, which can be used to update the user's profile. The method ends at S116.

In the even that there is text to be translated for more than one language pair, the method may be repeated, using a user preferences matrix for each language pair under consideration.

Figure 3:
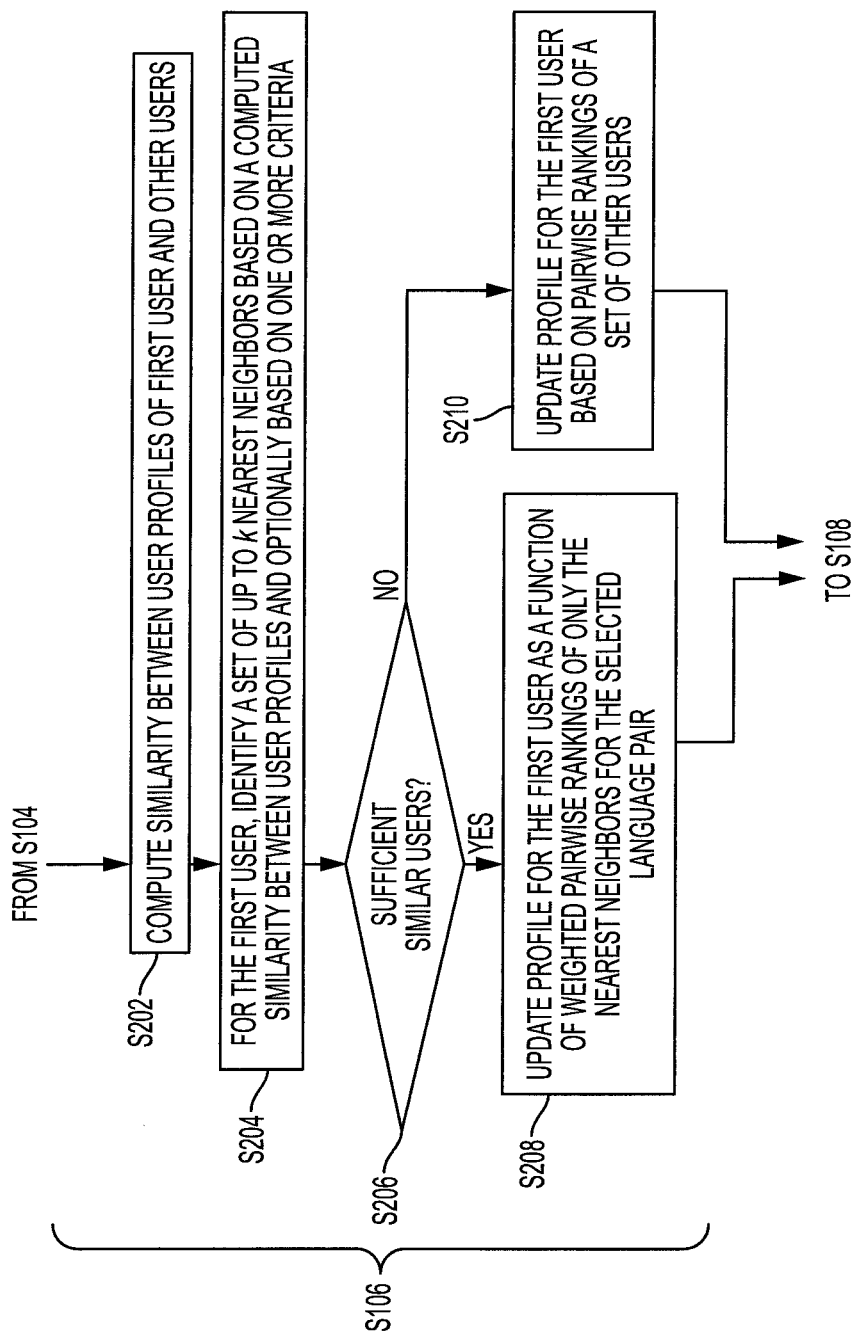
FIG. 3 illustrates one method for updating a user profile in the method of FIG. 2.

With reference to FIG. 3, one method of updating the first user's user profile (S106) is shown in accordance with one aspect of the exemplary embodiment. At S202, for each of a subset the other users (the subset including a plurality of, i.e., at least two of the other users) whose profiles include a ranking for a given one of the pairs of machine translation systems, a similarity is computed between the first user profile and the other user's profile, e.g., by the similarity computation component 58.

At S204, a set of up to k nearest neighbors to the first user is identified from the plurality of other users, e.g., by the k-NN ID component 60, based on the similarities computed between the user profiles 40 of the first user and those of the other users.

If at S206, the number of nearest neighbors meeting one or more similarity criteria meets a threshold number, the method proceeds to S208, otherwise to S210.

At S208 the user profile for the first user is updated, based on the profiles of only the identified nearest neighbors. This may include computing a ranking for the given MT system pair for the first user, based on a weighted function of the corresponding pairwise rankings from the user profiles of only the identified nearest neighbors.

Otherwise, at S210, if the number of nearest neighbors meeting the similarity criteria does not meet the threshold, an alternative method for computing the first user pairwise ranking for the MT system pair may be used, for example, based on the pairwise rankings of a larger group or all of the users.

In some embodiments, S202 to S208 (or S210) is repeated to compute a ranking for at least one other given MT system pair for the first user, which, in turn, is based on a weighted function of the corresponding pairwise rankings from the user profiles of only the identified nearest neighbors for that MT system pair.

Figure 4:
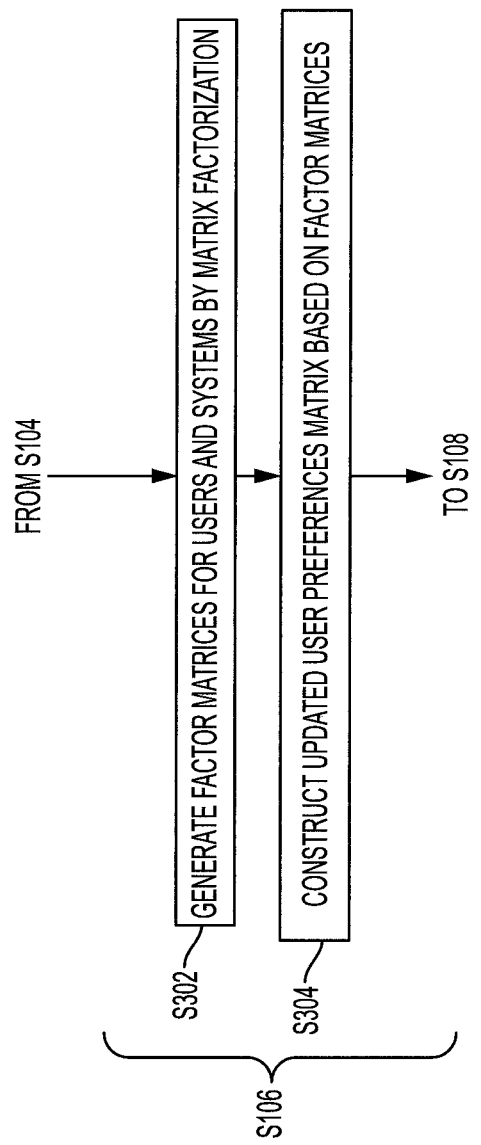
FIG. 4 illustrates another method for updating a user profile in the method of FIG. 2.

With reference to FIG. 4, another method of updating the first user's user profile (S106) is shown in accordance with another aspect of the exemplary embodiment. At S302, the user profile matrix 40 is decomposed into latent factor matrices, one for users and the others for machine translation systems (or MT system pairs). At S304, an updated user profile matrix is reconstructed, based on the factor matrices.

The method illustrated in one or more of FIGS. 2-4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 18, (for example, an internal hard drive of RAM), or may be separate (for example, an external hard drive operatively connected with the computer 18), or may be separate and accessed via a digital data network such as a local area network (LAN) or the Internet (for example, as a redundant array of inexpensive of independent disks (RAID) or other network server storage that is indirectly accessed by the computer 18, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in one or more of FIGS. 2-4 can be used to implement the method for translation system prediction. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Further details of the system and method will now be described.

In the following, the terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Collaborative Filtering

Collaborative Filtering (CF) has been used is by recommender systems to suggest items to users, such as books or movies. The recommendations are personalized for each individual user to fit his or her taste or preferences. In the present system and method, a collaborative filtering approach is used to recommend or automatically select a machine translation system (which can be an entire system or a component thereof) that a user is predicted to prefer over other translation systems for a given source language target language pair.

In one embodiment, illustrated in FIG. 3, similar users are identified as those that agree with the current user over a set of previously-rated translations. In k-nearest-neighbors CF, each user is represented by a vector of his or her preferences 40, termed a user profile, where each entry of the vector is, for example, a rating of a pair of translation systems. k similar users are then identified by measuring the similarity between the users' vectors.

In a collective matrix factorization method of collaborative filtering (CMF-CF), illustrated in FIG. 4, the user profiles 40 may also include pairwise rankings of pairs of MT systems, as for the k-NN-CF method. In other embodiments, the user profiles 40 may include individual rankings of MT systems, again with some missing entries for MT systems that have not been ranked by the respective user.

In another embodiment, a different collaborative filtering method may be used for updating the first user profile based on the profiles of one or more other users.

Generating User Profiles (S102)

The exemplary system and method capture the subjective preferences of individual users in order to identify the systems or specific translations which the user is expected to prefer subjectively.

Thus, for example, a user may dislike word order errors more than word translation choice errors, while for another user, the number of errors may be a more important factor. The user does not need to recognize his or her own preferences. Rather, their subjective evaluations of machine translations allow the system to select a system for machine translation which best suits their individual preferences.

For each source/target language pair the system may have access to a set of machine translation systems 46, 48, 50, etc. which are used to generate target language translations of a set of text strings, such as sentences, in the source language. Alternatively, pairs of source and target strings may be collected from an online resource. Users are asked to rank the translation pairs produced by a set of the machine translation systems. Since this would be time consuming and difficult for the user to perform if asked to evaluate all the translation systems for the language pair, each user may evaluate only a subset of them.

In one embodiment, for each source sentence from a set of source sentences, a user is presented with the source sentence itself, optionally a reference translation, and the outputs of a subset (e.g., at least three or at least four, or at least five) machine translation systems. The subset of systems for each user may be randomly or otherwise selected from the pool of participating MT systems, and are anonymized and their outputs are randomly-ordered when presented to the user. The user is asked to rank the subset of translations for each source sentence, optionally with ties allowed (i.e., two systems can receive the same ranking). The user may repeat the evaluation for each of a set of source sentences. In one embodiment, the results are aggregated over the sentences to provide pairwise rankings of the machine translation systems evaluated by the user. In another embodiment, the rankings for each sentence translated by a given MT system are aggregated (e.g., averaged, and optionally normalized) to produce an overall rank for the MT system. Each user may repeat the process for each of the language pairs in which he is interested.

Figure 5:
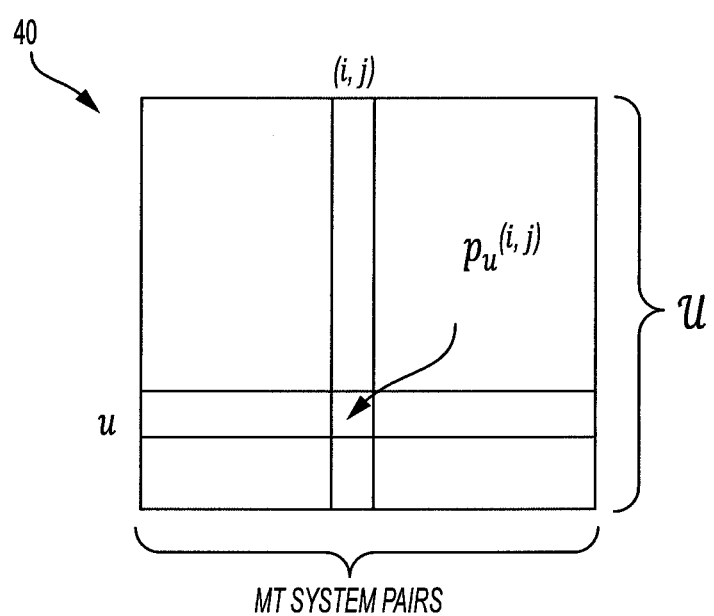
FIG. 5 illustrates a user preferences matrix suitable for use in the update method of FIG. 3.

In the embodiment illustrated in FIG. 5, for each user u ∈ U (where U are all users who annotated translations for a given language pair), a user-preference vector denoted $p_u$ is created that contains an entry for each pair $p_u^{(i,j)}$ of translation systems evaluated. Denoting the set of systems as S, this generates $$\frac{|\delta| \cdot (|\delta| - 1)}{2}$$

system pairs. As an example, for Czech-English, with eleven participating machine translation systems, the user vector size is 55. Each entry ((i, j)) of the vector that corresponds to one of the pairs evaluated by that user, is assigned the following value:

$$p_u^{(i,j)} = \frac{w_u^{(i,j)} - l_u^{(i,j)}}{w_u^{(i,j)} + l_u^{(i,j)}} \qquad (1)$$

where $w_u^{(i,j)}$ and $l_u^{(i,j)}$ are the number of wins and losses of system $s_i$ vs. system $s_j$ as judged by user u. Alternatively, when including ties in the denominator of the equation, Eqn. 1 may be replaced with $p_u^{(i,j)}=$ $$\frac{w_u^{(i,j)} - l_u^{(i,j)}}{w_u^{(i,j)} + t_u^{(i,j)} + l_u^{(i,j)}}.$$

However discarding ties may provide superior results.

With this representation, a user vector contains values between −1 (if $s_i$ always lost to $s_j$) and 1 (if $s_i$ always won). If the user always ranked the two systems identically, the value is 0, and if the user has never evaluated the pair, the entry is considered a missing value (NA). Altogether, this provides a matrix of users by system pairs, as illustrated in FIG. 5. The user preferences matrix 40 can be stored in memory.

In another embodiment, rather than matrix pairs, the user preferences matrix 40 includes rankings for individual MT systems.

Updating User Profiles (S106)

In the method of FIG. 3, the updating of the first user's profile may proceed as follows:

Computing Similarity between Users (S202)

Given a user preference to predict for a pair of systems ($s_i$, $s_j$), a similarity is computed at S202 between $p_u$ and each one of $p_{u'}$ for the other u' ∈ u. The similarity for each pair of users is based on the overlapping entries in their profiles, i.e., ignoring any entries of the vectors for which at least one of the pair of users is not available (NA).

Cosine similarity is one suitable function for measuring similarity between pairs of users. See, for example, Resnick, P, et al., "Grouplens: an open architecture for collaborative filtering of Netnews," Proc. 1994 ACM Conf. on Computer Supported Cooperative Work, pp. 175-186 (1994), Sarwar, B., et al., "Item-based collaborative filtering recommendation algorithms," Proc. 10th Intl Conf. on World Wide Web, pp. 285-295 (2001), Ricci, F., Rokach, L., and Shapira, B., "Introduction to recommender systems handbook" (2011). Other methods for computing similarity based on their user profiles are also contemplated, such as Pearson's correlation coefficient. See, Pearson, K., "Note on regression and inheritance in the case of two parents," Proc. Royal Society of London, 58, pp. 240-242 (1895). This coefficient allows normalizing users' ratings in order to address different rating patterns across users (the tendency for some users to tend towards higher (or lower) ratings than the average user). In comparison to cosine similarity, the vector entries are normalized with respect to the user's average rating. In the exemplary method, such normalization is generally not needed since the entries of the users' vectors represent comparisons rather than absolute ratings.

Identifying a Set of Similar Users (S204)

At S204, a set of up to k of the most similar users is identified as nearest neighbors, based on the similarity computation, and their user profiles are identified. k is a number which is less than the total number of other users being considered for the language pair, and thus may depend on the number of available other users, and may be, for example, at least 5, or at least 10. To improve the identification of similar users, criteria may be established for filtering out candidate nearest neighbors. For example, there may be a requirement that both users u and u' have rated at least a threshold quantity (e.g., number m or proportion) of common system pairs, e.g., m is at least two (or at least three). Otherwise, if this condition is not met, u' is excluded from the set of similar users and its user's vector is not used to compute the CTP prediction. Additionally, a threshold may be established on the similarity score between two users u and u' For example, the similarity must be above a certain (positive) threshold t (e.g., t=0, or 0.05, or 0.1), otherwise u' is excluded from the set of similar users.

In one embodiment, if at S206, a minimum number n of users (e.g., n=3, or 4, or 5, or 10 users) that meet the two criteria on m and t is not met, then the method proceeds S210, where an alternative method for predicting translational preferences may be used.

Updating Translational Preferences for the User (S208, S210)

Given the similarity scores computed at S202, to predict the user's preference for a target pair of machine translation systems at S208, a weighted average of the predictions of the top ≤k most-similar-users (meeting the established criteria) may be computed, using the similarity score as the weighting for the respective other user's pairwise ranking. For example, the update component 62 computes the prediction function $f$ shown in Eqn. (2) for a given user u and a MT system pair ($s_i$, $s_j$), as a weighted average:

$$f_{ctp}(u)^{(i,j)} = \text{sign}\left(\frac{\sum_{u' \in MSU(u)} p_{u'}^{(i,j)} * sim(u, u')}{\sum_{u' \in MSU(u)} sim(u, u')}\right) \quad (2)$$

where MSU(u) is the set of most similar users u' (the nearest neighbors) of u (u'≠u); $p_{u'}^{(i,j)}$ are the preferences of user u' ∈ MSU(u) for ($s_i$, $s_j$) and sim(u, u') is the similarity score between the two users. Eqn. (2) computes the sign of the weighted average. In the latter case, a positive value indicates $s_i$ is the preferred system, while a negative one means it is $s_j$ and a zero is a draw, which rarely occurs in practice. In the evaluation, below, this prediction is compared to the sign of the actual preference of the user, $p_u^{(i,j)}$ to compute a measure of the accuracy of the system.

The exemplary function uses cosine similarities of at least 0. If cosine similarities of less than 0 are to be considered, these similarity scores may be converted to a positive scale.

In some embodiments, the prediction for the pair of MT systems may be the absolute value of the weighted average, rather than the sign:

$$f_{ctp}(u)^{(i,j)} = \left(\frac{\sum_{u' \in MSU(u)} p_{u'}^{(i,j)} * sim(u, u')}{\sum_{u' \in MSU(u)} sim(u, u')}\right) \quad (3)$$

The denominator $\sum_{u' \in MSU(u)} sim(u, u')$ serves as a normalizing factor and can be omitted if only the sign is predicted, since all the similarity scores used are positive values. However, by retaining it, as in Eqn. (3), a normalized score can be obtained that can be generalized for other decision criteria, such as when predicting an optimal MT system based on the computed rankings of two or more of the system pairs.

If not enough similar users who meet the criteria at S206 are found, then at S210, an alternative method may be used, such as a non-weighted average preference (ranking) across all other users whose profiles include a pairwise ranking for the machine translation pair (denoted AVPF).

When more than two machine translation systems are being compared, S202-S208 (or S210, where appropriate) may be repeated for one or more (or all) of the other translation system pairs that the user has not ranked. For each pair of translation systems, a different set of nearest neighbors may be identified, since only the other users who have rated that particular translation pair are considered as candidate nearest neighbors.

For example, suppose that a (simplified) user preferences matrix 40 as shown in FIG. 6 is generated for a set of users A-G, for a selected language pair, such as French→English. Here, there are only 4 machine translation systems to choose from, denoted 1, 2, 3, and 4. In this example, each of users A-G has evaluated translations for 4 MT pairs, and illustrative rankings on a scale of −1 to +1 computed. NA denotes that the pair has not been evaluated by that user. Suppose that a machine translation system is to be selected for User G, who has ranked MT pairs 1, 2; 1, 3; 1, 4; and 2, 3. Then, for each of the remaining translation pairs, 2, 4 and 3, 4, a set of nearest neighbors is identified. In this example, k may be set at 4, with a minimum k of 2, vectors v1, v2 with at least two elements in common (where the vector elements are rankings where both users have ranked an MT system), and a similarity threshold of 0.1. For translation pair 2, 4, there are 5 candidate nearest neighbors: other users A-E. A similarity is then computed between user G and each of the candidate nearest neighbors A-E to identify the up to four most similar who meet the threshold on cosine (or other) similarity for the two vectors.

Using the cosine similarity as the similarity measure, $$sim(u, u') = \frac{v1 \cdot v2}{\|v1\|\|v2\|},$$

where $v1 \cdot v2 = v1[1]*v2[1] + v1[2]*v2[2], \ldots$, and $\|v\| = \sqrt{(v1[1])^2 + (v1[2])^2} \ldots$ Then for the pair G and A, the vectors v1, v2 are (0.1, 0.7, −0.3) and (0.1, 0.7, −0.4) and the cosine similarity =

$$\frac{(0.1*0.1) + (0.7*0.7) + (-0.4*-0.3)}{\sqrt{((0.1)^2 + (0.7)^2 + (-0.4)^2) * ((0.1)^2 + (0.7)^2 + (-0.3)^2}} = 0.9936.$$

Similarly, for the pairs G, B, G, C, G, D, and G, E, the cosine similarity is 0.9487, 0.7101, 0.9627 and 0.6508. Thus, the k nearest neighbors are A, B, C and D.

Using Eqn. 2:

$$f_{ctp}(\text{user } G)^{(2,4)} =$$

$$\frac{\Sigma(0.4*0.9936) + (0.7*0.9487) + (0.4*0.7101) + (0.5*0.9627)}{\Sigma 0.9936 + 0.9487 + 0.7101 + 0.9627} = 0.5054$$

This can be rounded to the same number of decimal places as the rankings, e.g., 0.5 in the illustrated case. Given the five pairwise rankings now available for user G, the system would rank the four MT systems 1-4 as follows: 3, 1, 2, 4. Then at S108, the prediction component 34 may suggest MT system 3 as the preferred system for user G. If more information is needed, the same calculation could be performed for the MT pair 3, 4 before proceeding to S108.

Assume that user H then registers with the system, but there is not enough information to identify nearest neighbors based on preferences. In this case, a cosine similarity may be computed based on metadata acquired for user H and that for each (or at least some) of the other users in order to find the k nearest neighbors and then proceed as described above for step S208.

In the method of FIG. 4, the updating of the first user's profile may proceed as follows:

Generation of Factor Matrices (S302)

Figure 7:
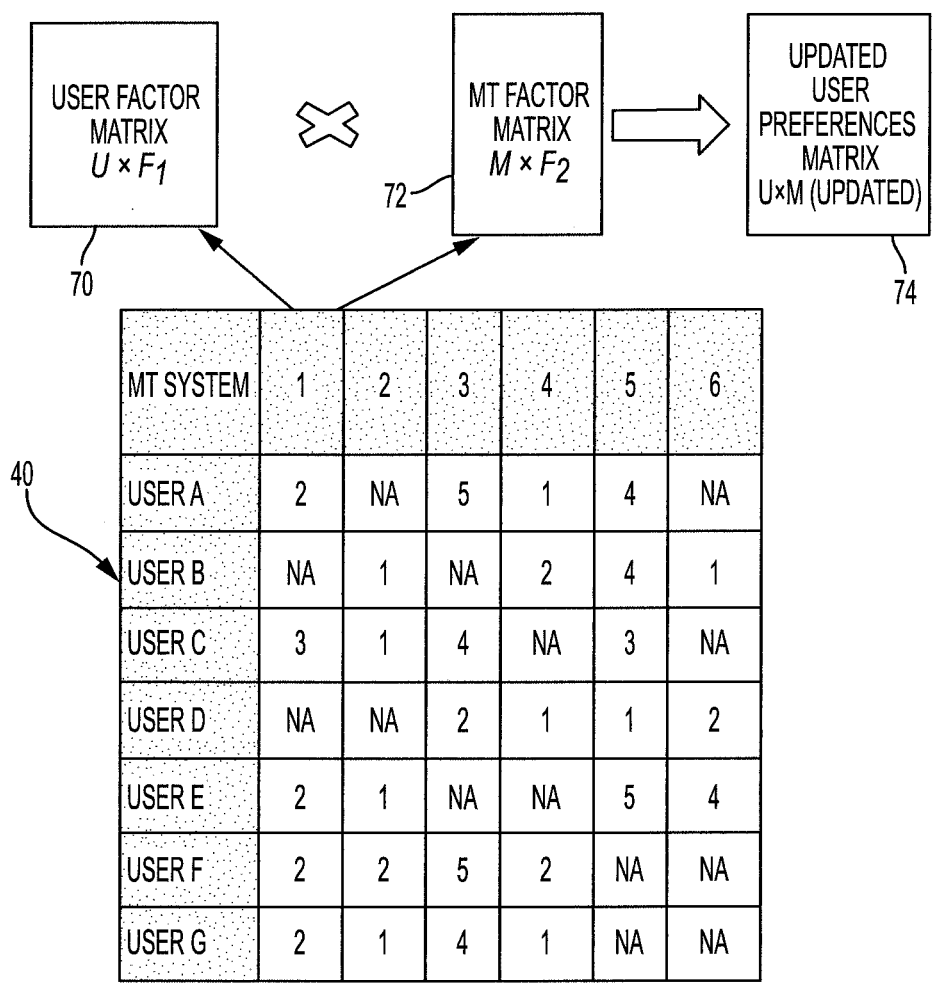
FIG. 7 illustrates a user preferences matrix and latent factor matrices suitable for use in the update method of FIG. 4.

With reference to FIG. 7, the user preferences matrix 40 is decomposed into two latent factor matrices 70 and 72 by matrix factorization. A first latent factor matrix 70 is a U×$F_1$ matrix, where U is the number of users and $F_1$ is the number of latent factors. Each user is thus represented in the matrix 70 as a vector of latent factors. A second latent factor matrix 72 is a M×$F_2$ matrix, where M is the number of machine translation systems (or MT system pairs) and $F_2$ is the number of latent factors. Each MT system or pair of MT systems is thus represented in the matrix 72 as a vector of $F_2$ latent factors. In one embodiment, $F_1=F_2$. The values of $F_1$ and $F_2$ can be selected to optimize performance and/or computational efficiency.

Various methods may be employed to decompose the user preferences matrix into latent factor matrices. See, for example, U.S. Pat. No. 7,756,753 and U.S. Pub. Nos. 20130226839, 20140156579, 20140180760, 20140258027, and U.S. application Ser. No. 14/669,153, filed Mar. 26, 2015, entitled TIME-SENSITIVE COLLABORATIVE FILTERING THROUGH ADAPTIVE MATRIX COMPLETION, by Jean-Michel Renders, incorporated herein by reference, and in Steffen Rendle et al., "Online-updating regularized kernel matrix factorization models for large-scale recommender systems," Proc. 2008 ACM Conf. on Recommender Systems (RecSys), 2008. In one embodiment, singular value decomposition or non-negative matrix factorization may be used for matrix factorization, although other methods for matrix factorization may be employed. The generation of the latent factor matrices can be performed iteratively, e.g., by updating first one then the other of the latent factor matrices, with the objective of optimizing a similarity between an updated user preferences matrix 74, regenerated from the latent factor matrixes, and the values of the original user preferences matrix 40.

Construction of Updated User Preferences Matrix (S304)

The updated user preferences matrix 74 is generated as a function of the factor matrices 70 and 72, e.g., as a product of the first factor matrix, the second factor matrix (or its transpose) and optionally a diagonal matrix. Given the updated user preferences matrix 74, the missing values of the row of the original user preferences matrix 40 corresponding to the user profile may be copied from the updated user preferences matrix 74, or otherwise based thereon to generate an updated user profile for the first user.

Predicting a Machine Translation System for the Target User (S108)

The personalized CTP method or CMF method described above may be used alone or combined with each other and/or other methods for predicting a suitable machine translation for a user. For example, the prediction based on the updated user profile may be aggregated with other scores, such as a score based on the content of the sentence(s) to be translated.

One factor with respect to preferences information is the quality of translation: when all translations are genuinely poor, preferences play a less significant role. This may have suppressed preferences in the data used. Hence, it may be beneficial to evaluate the prediction of preferences separately across different levels of translation quality, e.g., as measured with an automated translation scoring system, such as the BLEU score (see Papineni, K., et al., "BLEU: a Method for Automatic Evaluation of Machine Translation," Proc. ACL, pp. 311-318 (2002)) or NIST (see Doddington, G., "Automatic evaluation of machine translation quality using n-gram co-occurrence statistics," Proc. 2nd Intl Conf. on Human Language Technology Research, pp. 138-145 (2002)), or by estimating the post-editing effort required to modify the translation to be identical to a reference translation, via metrics such as the translation edit rate (TER) (see Snover, M., et al., "A Study of Translation Edit Rate with Targeted Human Annotation," Proc. of Assoc. for Machine Translation in the Americas, pp 223-231(2006)).

Various other modifications to the system and method are also contemplated.

In one embodiment, rankings can be obtained implicitly, e.g., by presenting two translations and assuming the one selected for post-editing is the preferred one. The preferences of translators, however, may be driven by the ease of correction more than anything else. When the users are end-users (the readers of the translations produced) rather than translators who constitute a completely different user group, a relatively simple kind of explicit feedback, such as a binary feedback ('good'/'bad' translation), from which users preferences and similarity can be inferred may be used. For example, an online MT provider may collect end-user feedback for their proposed translations which may also be used for TP prediction. Even with such a system in place, it remains unlikely that sufficient feedback will be obtained from every user.

In another embodiment, preferences for groups of users may be additionally or alternatively be based on socio-demographic traits, such as gender, age or native language, or based on (e.g., Big-5) personality traits. These can be explicitly collected or inferred, for example, by automatically analyzing users' texts.

In another embodiment, outliers may be identified and removed from/included in the set of nearest neighbors (or treated differently). In this embodiment, it is assumed that some users have stronger preferences or dis-preferences for the output of certain systems over other ones. Such users are considered as "outliers" with respect to the "common preference". To identify such outliers, the vector of system pair preferences for each user is used to compute a single vector with the average preferences of all users, excluding the assessed user. Missing values in the vectors are replaced with a fixed value, such as 0.0. This is not always a correct strategy to impute missing values, but it is a reasonable one since it corresponds to the user not having any preference between the two systems (i.e., wins=losses). Then a paired t-test (or paired Wilcoxon test) is performed between the vector of each user and the average vector, and the users for which the test resulted with p less than a threshold value, e.g., $p<0.05$, are marked as outliers and excluded/included. By focusing on users who are outliers, prediction can, in practice, be more accurate.

The system and method find application in a variety of contexts. In one embodiment, a multilingual customer modeling method is used to gather information about customers in multiple languages and analyze the information in a common language. For each language, the user's predicted optimal translation system is used for the translation. The information acquired about the customer from all the considered languages is then aggregated into a single customer model.

In another application, when interacting with the customer in his or her own language, a dialog system which conducts a conversation between the customer and an agent (real or virtual) is able to do so in a way that would be most suitable for the customer's personality by translating the agent's and/or the customer's speech acts using a predicted customer-preferred translation system.

Without intending to limit the scope of the exemplary embodiment, the following examples illustrate the effectiveness of the system and method.

EXAMPLES

The method for predicting translational preferences for a first user based on the k-nearest-neighbors approach for user-user collaborative filtering was compared with other methods. A large set of human pairwise-comparisons between automatic translations was used in the evaluation. The pairwise rankings were derived from a collection of user rankings of MT systems from a shared translation task. The results obtained indicate that the personalized method consistently outperforms several other approaches that rank the systems in general, disregarding the specific user. This indicates that user feedback can be employed towards a more personalized approach to machine translation.

The data used was from that provided for the MT Shared Task in the 2013 Workshop on Statistical Machine Translation (WMT) Bojar, O., et al., "Findings of the 2013 Workshop on Statistical Machine Translation," Proc. 8th Workshop on Statistical Machine Translation, pp. 1-44 (2013), hereinafter "Bojar 2013" (http://www.statmt.org/wmt13/translation-task.html). This data was of a particularly large scale, with crowd-sourced human judges, either volunteer researchers or paid Amazon Turkers. For each source sentence, a judge (corresponding to a user) was presented with the source sentence itself, a reference translation, and the outputs of five machine translation systems. The five systems were randomly selected from the pool of participating systems, and were anonymized and randomly-ordered when presented to the judge. The judge had to rank the translations, with ties allowed (i.e., two system can receive the same ranking). Hence, each annotation point was provided with 10 pairwise rankings between systems. Translations of 10 language pairs were assessed, with 11 to 19 systems for each pair, as shown in TABLE 1. The columns show, for each language-pair, the number of participating systems, the amount of non-tied pairwise rankings extracted from the judges' rankings and the average number of rankings per system.

TABLE 1

Translations Used

| Language Pair | Systems | Rankings | Average |
|---|---|---|---|
| Czech-English | 11 | 85,469 | 7769.91 |
| English-Czech | 12 | 102,842 | 8570.17 |
| German-English | 17 | 128,668 | 7568.71 |
| English-German | 15 | 77,286 | 5152.40 |
| Spanish-English | 12 | 67,832 | 5652.67 |
| English-Spanish | 13 | 60,464 | 4651.08 |
| French-English | 13 | 80,741 | 6210.85 |
| English-French | 17 | 100,783 | 5928.41 |
| Russian-English | 19 | 151,422 | 7969.58 |
| English-Russian | 14 | 87,323 | 6237.36 |
| Total | 148 | 942,840 | 6370.54 |

In total, over 900,000 non-tied pairwise rankings were collected. The Turkers' tasks included a control task for quality assurance, rejecting Turkers failing more than 50% of the control points. The inter-annotator score showed on average a fair to moderate level of agreement.

Evaluation Methodology

In the following experiments, the goal was to predict which of two translation systems would be preferred by a given user. The exemplary method, as well as several other prediction functions were compared with the user's pairwise system preference according to the annotation; that is, $p_u^{(i,\,j)}$, shown in Equation 1. For each user this is an aggregated value over all the user's pairwise rankings, determining the preferred system as the one chosen by the user (i.e., ranked higher) more times.

A leave-one-out experiment was performed. For each language pair, an iteration was performed over all non-NA entries in the user-preferences matrix, removing the entry and trying to predict it. The "gold" preference is positive when the user prefers $s_i$, negative when the user prefers $s_j$ and 0 when the user has no preference between them. Hence, each of the assessed methods is measured by the accuracy of predicting the sign of the preference.

CTP Parameters

Similarity function: cosine.

m=2: the minimal number of intersecting entries between another user's vector and the target user's vector to consider the other user as similar.

k=50: the maximal number of similar users (|MSU(u)| ≤ k).

$p_u$ entries are not normalized by ties

Similarity threshold: 0.05. That is, all users with positive similarity scores of at least 0.05 may be considered for the weighted average. Minimal number of users required for computing CTP's prediction before using the fallback: 5.

For the CTP method, if not enough similar users who meet the criteria (S108) are found, then a non-weighted average preference across all users (denoted AVPF) is used. In the experiment, the fallback was used 0.1% of the times.

Other Prediction Methods

The exemplary CTP method described above was compared to the following prediction methods:

1. Always i (ALI): This is a naive baseline showing the score when always predicting that system i wins. Note that the baseline is not simply 50%, due to ties.

2. Average rank (RANK): Here, two systems are compared by the average of their rankings across all annotations (r ∈ {1,2,3,4,5}):

$$f_{rank}(u)^{(i,j)} = \text{sign}(\bar{r}_j - \bar{r}_i) \qquad (3)$$

where $\bar{r}_j$ and $\bar{r}_i$ are the average ranks of $s_j$ and $s_i$ respectively. Since a smaller value of r corresponds to a higher rank, the rank of $s_i$ is always subtracted from $s_j$. Thus, if $s_i$ is ranked on averaged higher than $s_j$, the prediction would be positive, as desired.

The average rank is computed once in advance for each system, and therefore includes also the test entry that is removed in the evaluation of the CTP method. This method therefore, gives a slight advantage over the CTP method.

3. Expected (EXPT): This metric, proposed by Koehn (Koehn, P., "Simulating human judgment in machine translation evaluation campaigns," IWSLT, pp. 179-184 (2012)) and used in Bojar 2013 in order to rank the systems that participated in the benchmark, compares the expected wins of the two systems. Its intuition is explained as follows: "If the system is compared against a randomly picked opposing system, on a randomly picked sentence, by a randomly picked judge, what is the probability that its translation is ranked higher?" The expected wins of a $s_i$, $e(s_i)$, is the probability of $s_i$ winning when compared to another system, estimated as the total number of wins of $s_i$ relative to the total number of comparisons involving it, excluding ties, and normalized by the total number of systems excluding $s_i$, $|\{s_k\}|$:

$$e(i) = \frac{1}{|\{s_k\}|} \sum_{k \neq i} \frac{w^{(i,k)}}{w^{(i,k)} + l^{(i,k)}} \qquad (4)$$

where wins $w^{(i,\,k)}$ and losses $l^{(i,\,k)}$ are summed over all users. The preference prediction is therefore:

$$f_{expt}(u)^{(i,j)} = \text{sign}(e(i) - e(j)) \qquad (5)$$

RANK and EXPT predict preferences based on a system's performance in general, when compared to all other systems.

4. Average user preference (AVPF): This method considers only the specific system pair and averages the user preferences for the pair. Formally:

$$f_{avpf}(u)^{(i,j)} = \text{sign}\left(\frac{\Sigma_{u'} p_{u'}^{(i,j)}}{|\{u'\}|}\right) \qquad (6)$$

where u'≠u, and {u'} are all users except u.

This method can be viewed as a non-personalized version of CTP, with two differences:

(1) It considers all users, and not only similar ones.

(2) It does not weight the preferences of the other users by their similarity to the target user.

This is a method suggested for S210, when there is not enough reliable information for using the CTP method of S208.

Results

Figure 8:
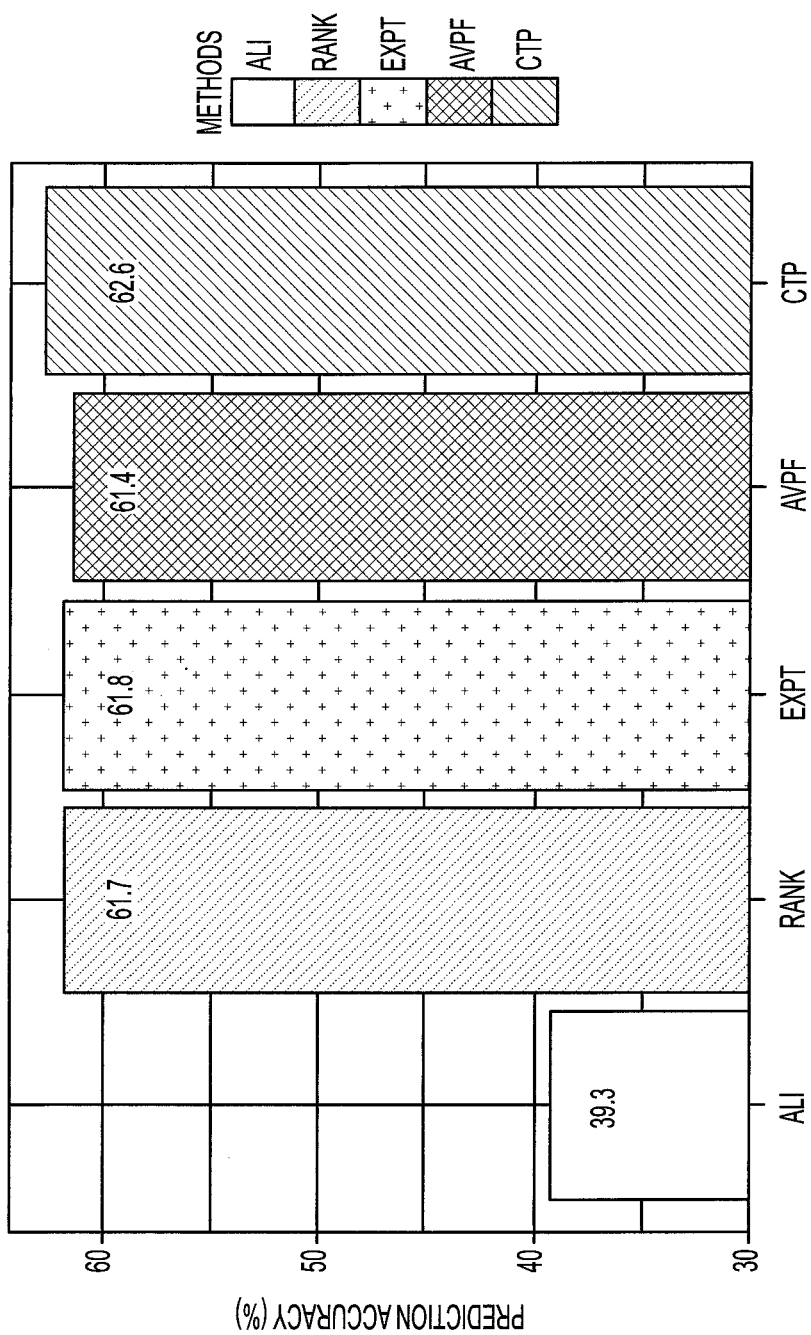
FIG. 8 shows micro-averages over a set of data points.

Table 2 shows experimental results in accuracy percentage for the 10 language-pairs, including the languages: Czech (cs), English (en), German (de), Spanish (es), French (fr) and Russian (ru). The best results is in bold. FIG. 8 shows a micro-average of these results, when giving each of the 97,412 test-points an equal weight in the average. The difference between CTP and each of the other methods is highly statistically significant.

TABLE 2

| Lang. pair | f | Accuracy | Lang. pair | f | Accuracy |
|---|---|---|---|---|---|
| cs-en | ALI | 31.6 | en-cs | ALI | 36.2 |
|  | RANK | 62.9 |  | RANK | 67.8 |
|  | EXPT | 63.5 |  | EXPT | 67.9 |
|  | AVPF | 63.5 |  | AVPF | 67.4 |
|  | CTP | 64.4 |  | CTP | 68.2 |
| de-en | ALI | 41.7 | en-de | ALI | 42.0 |
|  | RANK | 62.6 |  | RANK | 67.2 |
|  | EXPT | 62.6 |  | EXPT | 66.9 |
|  | AVPF | 62.6 |  | AVPF | 66.5 |
|  | CTP | 63.5 |  | CTP | 67.6 |
| es-en | ALI | 35.5 | en-es | ALI | 35.9 |
|  | RANK | 61.0 |  | RANK | 62.3 |
|  | EXPT | 61.2 |  | EXPT | 63.0 |
|  | AVPF | 61.4 |  | AVPF | 61.5 |
|  | CTP | 63.0 |  | CTP | 62.6 |
| fr-en | ALI | 35.0 | en-fr | ALI | 35.0 |
|  | RANK | 61.3 |  | RANK | 65.0 |
|  | EXPT | 61.2 |  | EXPT | 65.1 |
|  | AVPF | 61.2 |  | AVPF | 64.4 |
|  | CTP | 61.8 |  | CTP | 65.3 |

TABLE 2-continued

| Lang. pair | f | Accuracy | Lang. pair | f | Accuracy |
|---|---|---|---|---|---|
| ru-en | ALI | 43.5 | en-ru | ALI | 44.6 |
|  | RANK | 57.6 |  | RANK | 70.2 |
|  | EXPT | 57.8 |  | EXPT | 72.1 |
|  | AVPF | 56.6 |  | AVPF | 71.4 |
|  | CTP | 58.2 |  | CTP | 72.4 |

CTP outperforms all others for 9 out of 10 language pairs, and in the overall micro-averaged results. The difference between CTP and each of the other metrics was found statistically significant with $p < 5 \cdot 10^{-6}$ at worst, as measured with a paired Wilcoxon signed rank test (Wilcoxon, F., "Individual Comparisons by Ranking Methods," Biometrics Bulletin, 1(6):80-83 (1945)) on the predictions of the two methods. The significance test captures the fact that the methods disagreed in many more cases than is visible by the score difference. The CTP method was found superior to all others also when computing macro-average, taking the average of the scores of each language pair, as well as the results when the ties are included in the computation of $p_u$.

In this experiment a global set of parameters was used which were not tuned for each language pair separately (discarding ties in annotations, k=50 (maximum), both users u and u' have rated at least a two common system pairs, and a threshold on the similarity score between two users u and u' of 0.05). It is reasonable to assume that tuning these parameters could improve results. For example, selecting k, the number of users, to include in the similarity function, may be made dependent on the total number of users. E.g., for en-es, where there are only 57 users in total, reducing k's value from 50 to 25, improves results of CTP from 62.6% to 63.2%, higher than all other methods (whose scores are not affected).

In comparison to AVPF, weighting by the similarity scores was found to be a more significant factor than selecting a small subset of the users. This can be expected, since the less-similar users that are added to MSU have smaller impact on the final decision as their weight in the average is smaller.

One weakness of CTP, as well as other methods, is that they do not always predict ties well. In the above experiment, approximately 13.5% of the actual preferences were 0 and none of them was correctly identified. It appears that numerical accuracy is not the main cause of this. Rather, setting any prediction that is smaller than some values of |ε| to 0 deteriorated performance. Arguably, ties need not be predicted, since if the user has no preference between two systems, any choice is just as good. Still, with better ties prediction, a general improvement in the method is expected. For example, the user could be asked to review more sentences and their translations when the pairwise ranking is close to 0.

The results suggest that better translations we can be provided to each user by taking his or her past feedback into account. The gain is modest in absolute numbers, but the results are highly statistically significant and stable over parameter values.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for predicting an optimal machine translation system for a user comprising:
   for each of a set of users, providing a respective user profile which includes rankings for at least some machine translation systems from a set of machine translation systems, the set of users including a first user and a plurality of other users, wherein the rankings are pairwise rankings for pairs of machine translation systems;
   updating the user profile of the first user based on the user profiles of at least a subset of the other users, the updating including generating at least one missing ranking, the updating including:
      for each of a subset of the other users whose user profiles include a pairwise ranking for a selected pair of the machine translation systems, computing a similarity between the first user's user profile and the respective other user's user profile;
      identifying, based on the computed similarities, a set of the other users as nearest neighbors to the first user, the identifying comprising applying at least one criterion for inclusion of the other users in the nearest neighbors; and
      computing a pairwise ranking for the pair of the machine translation systems as a function of the pairwise rankings of the nearest neighbors for the selected pair of machine translation systems, wherein when a number of the nearest neighbors does not meet a threshold number of nearest neighbors, the pairwise ranking for the pair of the machine translation systems is computed as a function of the pairwise rankings of at least one other of the users in addition to the nearest neighbors;
   predicting an optimal machine translation system for the first user from the set of machine translation systems based on the pairwise rankings for the pairs of machine translation systems in the updated user profile computed for the first user for translation of source text in a source language to target text in a target language;
   outputting a machine translation of source text in the target language for the first user, based on the prediction; and
   wherein at least one of the updating and the predicting of the optimal translation system is performed with a processor.

2. The method of claim 1, wherein the pairwise ranking for the pair of the machine translation systems is computed as a function of weighted pairwise rankings of the nearest neighbors for the selected pair of machine translation systems, wherein the weights are based on the computed similarities.

3. The method of claim 1, wherein the providing comprises generating the pairwise rankings from user rankings of machine translations of source text strings performed by a plurality of the machine translation systems.

4. The method of claim 1, further comprising, for a second selected pair of machine translation systems, repeating the identifying of a set of nearest neighbors and the computing of a function of the pairwise rankings of the nearest neighbors and wherein the predicting of the optimal machine translation system is also based on a pairwise ranking computed for the second selected pair of machine translation systems.

5. The method of claim 1, wherein the updating comprises decomposing a matrix of the user profiles into a plurality of latent factor matrices and constructing an updated matrix of user profiles based on the latent factor matrices.

6. The method of claim 1, further comprising translating source text from a source language into target text in a target language with the predicted machine translation system.

7. The method of claim 1, wherein each machine translation system in the set of machine translation systems is configured for translating source text from a same source language into target text in a same target language as the other machine translation systems in the set of machine translation systems.

8. The method of claim 1, further comprising outputting information based on the predicted optimal machine translation system.

9. A computer program product comprising a non-transitory recording medium storing instructions, which when executed on a computer, causes the computer to perform the method of claim 1.

10. A system comprising memory which stores instructions for performing the method of claim 1 and a processor in communication with the memory for executing the instructions.

11. A method for predicting an optimal machine translation system for a user comprising:
for each of a set of users, providing a respective user profile which includes rankings for at least some machine translation systems from a set of machine translation systems, the set of users including a first user and a plurality of other users, the rankings being pairwise rankings for pairs of the machine translation systems in the set of machine translation systems, each user profile comprising a vector of elements, one element for each of the machine translation pairs that the user has evaluated, each element (i, j) of the vector being assigned a value:

$$p_u^{(i,j)} = \frac{w_u^{(i,j)} - l_u^{(i,j)}}{w_u^{(i,j)} + l_u^{(i,j)}} \qquad (1)$$

where $w_u^{(i,j)}$ and $l_u^{(i,j)}$ are the number of wins and losses of system $S_i$ vs. system $s_j$, as judged by user u;
updating the user profile of the first user based on the user profiles of at least a subset of the other users, the updating including generating at least one missing ranking;
predicting an optimal translation system for the first user from the set of machine translation systems based on the updated user profile computed for the first user,
wherein at least one of the updating and the predicting of the optimal translation system is performed with a processor.

12. The method of claim 11, wherein the updating comprises:
for each of a subset of the other users whose user profiles include a pairwise ranking for a selected pair of the machine translation systems, computing a similarity between the first user's user profile and the respective other user's user profile;
identifying, based on the computed similarities, a set of the other users as nearest neighbors to the first user;
computing a pairwise ranking for the pair of the machine translation systems as a function of the pairwise rankings of the nearest neighbors for the selected pair of machine translation systems.

13. The method of claim 12, wherein the computing of the similarity comprises computing a cosine similarity between the user profiles.

14. The method of claim 12, wherein the identifying of the set of the other users as nearest neighbors to the first user comprises applying at least one criterion for inclusion of the other users in the nearest neighbors.

15. The method of claim 14, wherein the at least one criterion includes a criterion selected from:
the other user meeting a threshold on the computed similarity;
the other user having at least a threshold quantity of pairwise rankings for pairs of machine translation systems in common with the first user; and
combinations thereof.

16. The method of claim 14, wherein when a number of the nearest neighbors does not meet a threshold number of nearest neighbors, the pairwise ranking for the pair of the machine translation systems is computed as a function of the pairwise rankings of at least one other of the users in addition to the nearest neighbors.

17. The method of claim 12, wherein the updating of the user profile comprises computing a function $f$ for the first user u and a MT system pair $(s_i, s_j)$:

$$f_{ctp}(u)^{(i,j)} = \left(\frac{\Sigma_{u' \in MSU(u)} p_{u'}^{(i,j)} * sim(u, u')}{\Sigma_{u' \in MSU(u)} sim(u, u')}\right), \text{ or}$$

$$f_{ctp}(u)^{(i,j)} = \text{sign}(\Sigma_{u' \in MSU(u)} p_{u'}^{(i,j)} * sim(u, u')),$$

$f_{ctp}(u)^{(i,j)} = \text{sign}(\Sigma_{u' \in MSU(u)} P_{u'}^{(i,j)} * sim(u, u'))$,
where MSU(u) is the set of nearest neighbors u' of u;
each $P_{u'}^{(i,j)}$ is a respective ranking of user u' ∈ MSU(u) for $(s_i, s_j)$; and
sim(u, u') is the similarity computed between the two users.

18. A system for predicting an optimal machine translation system for a user comprising:
memory which stores a user profile for each of a set of users, each user profile including pairwise rankings for at least some pairs of machine translation systems drawn from a set of associated machine translation systems;
a similarity computation component which computes a similarity between a user profile of a first of the set of users and a user profile of another other of the set of users, for each of a subset of the users whose user profiles include a pairwise ranking for a selected pair of the machine translation systems;
a nearest neighbor identification component which identifies, based on the computed similarities, a set of the other users as nearest neighbors to the first user;
a prediction component which predicts an optimal machine translation system for the first user from the set of machine translation systems, based on a pairwise ranking computed for the selected pair of machine translation systems, the pairwise ranking for the pair of the machine translation systems being computed as a function of the pairwise rankings of the nearest neighbors for the selected pair of machine translation systems, wherein when a number of the nearest neighbors does not meet a threshold number of nearest neighbors, the pairwise ranking for the pair of the machine translation systems is computed as a function of the pairwise rankings of at least one other of the users in addition to the nearest neighbors; and a processor which implements the similarity computation component, nearest neighbor identification component, and prediction component.

19. The system of claim 18, further comprising at least one of:

a user profile generator which generates the user profiles, the user profile generator being implemented by a processor; and a translation generator which generates a translation using the predicted machine translation system, the translation generator being implemented by a processor.

20. A translation method comprising:

providing a set of machine translation systems for a selected language pair;

for each of a set of users, providing a respective user profile which includes pairwise rankings for at least some pairs of the machine translation systems in the set of machine translation systems, the set of users including a first user and a plurality of other users, each user profile comprising a vector of elements, one element for each of the machine translation pairs that the user has evaluated, each element (i, j) of the vector being assigned a value:

$$p_u^{(i,j)} = \frac{w_u^{(i,j)} - l_u^{(i,j)}}{w_u^{(i,j)} + l_u^{(i,j)}} \quad (1)$$

where $w_u^{(i,j)}$ and $l_u^{(i,j)}$ are the number of wins and losses of system $s_i$ vs. system $s_j$, as judged by user u;

for each of at least one pair of the machine translation systems, identifying a set of nearest neighbors to the first user based on a computed similarity between the first user's user profile and a respective other user's user profile;

predicting an optimal machine translation system for the first user from the set of machine translation systems based on the profiles of the nearest neighbors; and translating source language text into target language text using the optimal translation system, wherein at least one of the identifying of the set of nearest neighbors, the predicting of the optimal translation system, and the translating of the source language text is performed with a processor.

* * * * *